US007100150B2

(12) United States Patent
Polk (10) Patent No.: US 7,100,150 B2
(45) Date of Patent: Aug. 29, 2006

(54) METHOD AND APPARATUS FOR TESTING EMBEDDED EXAMPLES IN GUI DOCUMENTATION

(75) Inventor: George Allyn Polk, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 756 days.

(21) Appl. No.: 10/166,993

(22) Filed: Jun. 11, 2002

(65) Prior Publication Data

US 2003/0227480 A1     Dec. 11, 2003

(51) Int. Cl.
*G06F 9/44*     (2006.01)
*G06F 15/00*    (2006.01)
(52) U.S. Cl. ..................... 717/124; 715/513
(58) Field of Classification Search ........... 717/124, 717/136; 715/513, 515, 705, 760
See application file for complete search history.

(56) References Cited

U.S. PATENT DOCUMENTS

| 5,781,720 | A * | 7/1998 | Parker et al. ............ 714/38 |
| 6,249,882 | B1 * | 6/2001 | Testardi .................. 714/38 |
| 2003/0163788 | A1 * | 8/2003 | Dougherty .............. 715/523 |

OTHER PUBLICATIONS

"Software verification an functional testing with XML documentation", Friedman-Hill, E.J.; System Sciences, 2001. Processdings of the 34th Annual Hawaii Internation Conference, Jan. 3-6, 2001 p. 1-8, INSPEC Accession No.:6859640.*
"Using a document parer to automate software testing", Patricia Lutsky, Proceedings of the 1994 ACM symposium, Apr. 1994, pp. 59-63.*
"Codedocs: executable documents for documenters: the end of the passive user guide", Philip Buxton, Peter Furnier, Peter Sturgeon, Proceedings of the 10th annual international conference of systems documentation, pp. 115-119.*

* cited by examiner

*Primary Examiner*—Wei Zhen
*Assistant Examiner*—Philip Wang
(74) *Attorney, Agent, or Firm*—Osha Liang LLP (57) ABSTRACT

A method of testing an embedded example in a graphical user interface documentation includes creating an extractable embedded example by tagging the embedded example, extracting the extractable embedded example from the graphical user interface documentation to generate an extracted example, selecting a tagged entity from the extracted example, interpreting the tagged entity to generate an interpreted tagged entity, creating a test suite using the interpreted tagged entity, selecting a graphical tool against which to execute the test suite, executing the test suite against the graphical tool to generate an output response, and verifying the output response.

21 Claims, 9 Drawing Sheets

METHOD AND APPARATUS FOR TESTING EMBEDDED EXAMPLES IN GUI DOCUMENTATION

BACKGROUND OF THE INVENTION

Figure 1:
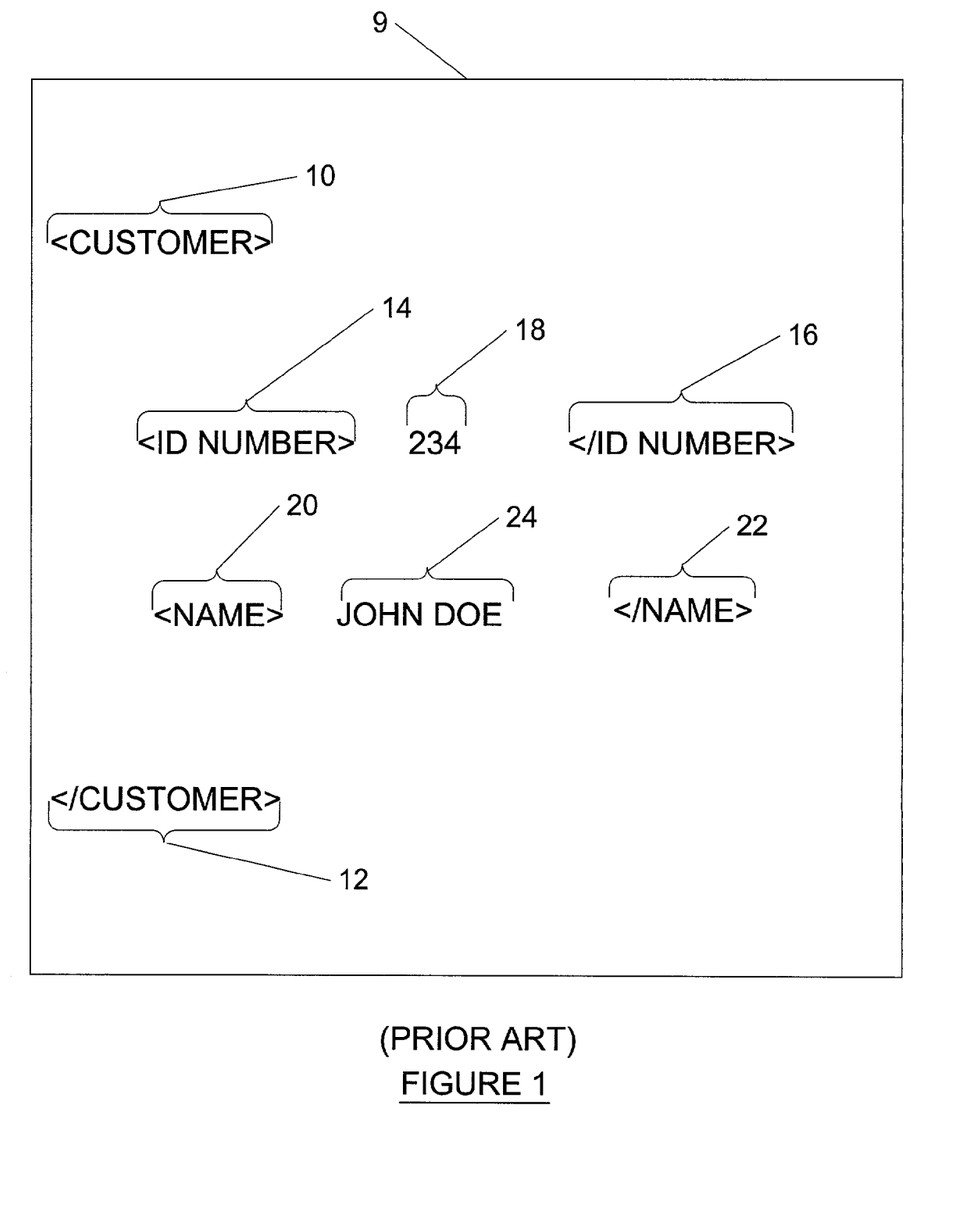
FIG. 1 shows a front view of document that includes XML-like tags.

Extended Markup Language (XML) is a markup language by which a definition may be assigned to one or more words in a document by using tags. In order to assign a definition to a phrase in a document, a tag pair, which includes a start tag, placed at the beginning of the phrase, and a closing tag, placed at the end of the phrase. FIG. 1 shows a front view of a document (9) in which text items are delineated by XML tag pairs. The document (9) may be, for example, part of documentation that explains the operation of a tool. An outer tag pair is represented by a start tag (10) and a closing tag (12), which define a CUSTOMER. A first nested tag pair defines an ID NUMBER for the CUSTOMER, with a start tag (14), a closing tag (16), with an ID NUMBER of 234 (18). A second nested tag pair defines a NAME, with a start tag (20), a closing tag (22), and a NAME of "John Doe."

Documentation associated with a tool (e.g., a command line tool, such as a Bash shell), a graphical user interface tool (a GUI tool), an operating system, a debugging tool, web applications, applets, custom software applications, etc.) can take multiple forms. Common forms of documentation include electronic reference texts, on-line help files, man pages, reference manuals, comments within source code, etc. Documentation may come in a variety of forms, such as computer files, which may be accessible through a web browser, editor, etc., or documentation may be in hard copy form, such as a book or technical manual.

Documentation may help explain a particular source code statement, explain a particular tool command or functionality, or instruct a user as to the function of the tool. For example, documentation for a GUI tool may explain to a user how to manipulate or use various widgets of the GUI tool, such as buttons, text boxes, dialog windows, etc. For example, a sentence in GUI tool documentation may display instructions telling the user to, "copy the contents of text box A into text box B, and hit 'Enter'." The GUI tool documentation may then display a result of the user performing the instructions, such as showing a picture of a window with the copied text. Likewise, command line tool documentation may display instructions telling the user to type a word or words. For example, the command line tool documentation may instruct the user to type "grep it file1" into the command line tool. The command line tool documentation may then show a result of the instruction, such as displaying a line or lines of text containing "it."

Several standard testing tools are used in testing of command line tools and GUI tools. One testing tool is a test suite, a collection of files of one or more tests used to determine whether a tool, e.g., GUI tool or a command line tool is functioning as specified. A test used within the test suite typically contains one or more inputs, as commands, to the tool being tested, designed to exercise one or more of the tool's features. A related testing tool is a test harness, which uses a test suite to test the operation of a tool being testing by accessing the test suite and applying the tests to the tool being tested. The test harness evaluates the response of the tool being tested to determine whether the tool being tested is working properly. Another component used in testing is a golden file. The golden file typically contains a pre-determined proper response of the tool being tested.

Examples embedded within tool (either command line tool or GUI tool) documentation may contain errors. The errors in such embedded examples may exist for a variety of reasons. One possible reason for the errors is improperly written code statements shown in command line tool documentation. Also, an image shown in GUI tool documentation as a result of a user action may not be the same as the image that actually is displayed when the user performs the user action. Changes in a system or a network configuration, etc., may also cause errors. Another source of errors is when a developer, software engineer, etc., changes the tool (either intentionally or unintentionally) in a way that is inconsistent with the tool's specification. Thus, the user may take some user action, and expects the particular response as documented in the tool documentation, but gets a different response from the tool. Such errors often result in frustrating the user of tool documentation.

Figure 2:
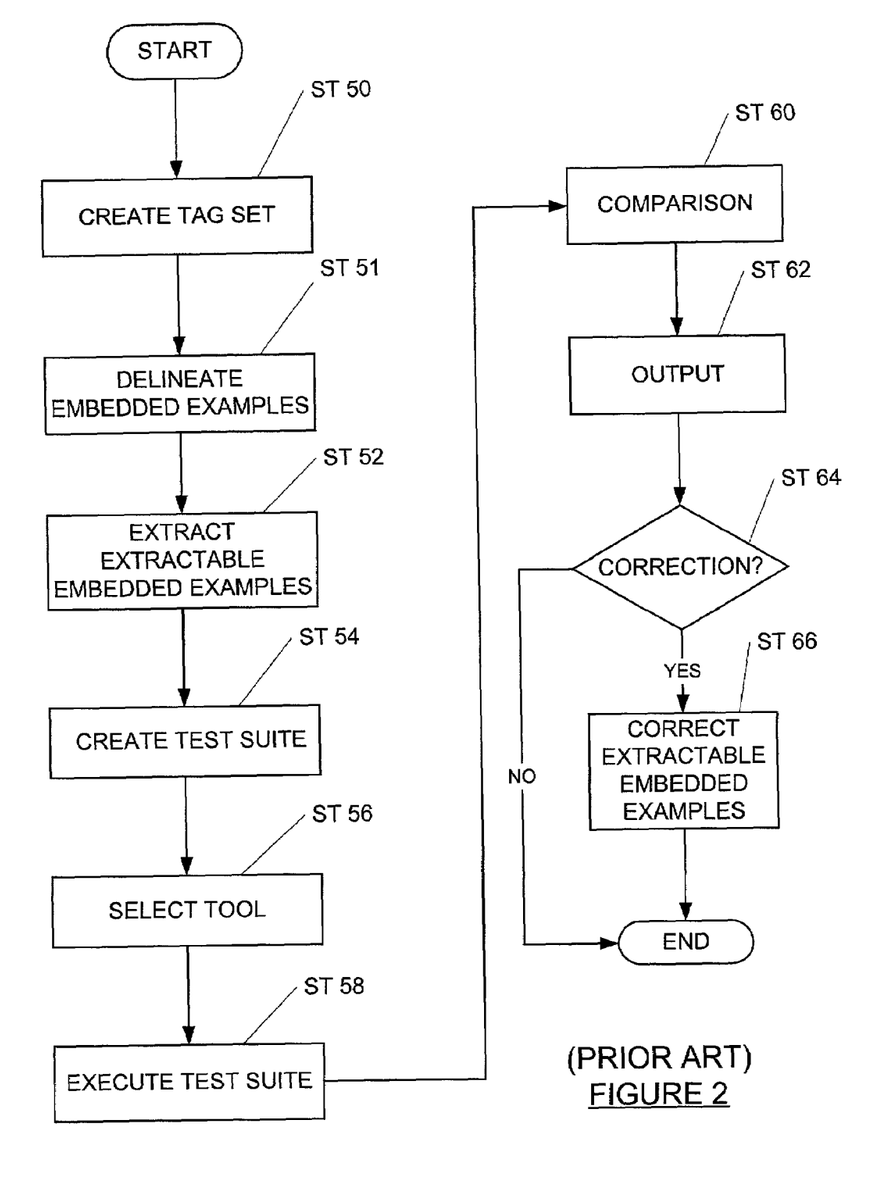
FIG. 2 shows a sequence of operations to test embedded examples in command line tool documentation.

FIG. 2 shows a sequence of operations to test embedded examples in command line tool documentation. Testing embedded examples in command line tool documentation is shown in FIG. 2 and described below.

A tag set is created (Step 50). The tag set includes tag pairs, such as, <test-example>, </test-example>, <test-step>, </test-step>, <test-name>, <test-name>, <test-source>, </test-source>, etc. Embedded examples in the command line tool documentation are tagged by delineating pertinent words or phrases in the command line tool documentation using tag pairs from the tag set (Step 51). Tagging the embedded examples creates extractable embedded examples. For example, for a command line tool whose main function is to accept a word typed via a keyboard, reverse the word, and print a reversed word to a display device, the command line tool documentation includes an embedded example that instructs the user, as follows:

Example 3.2.1. Type "reverse backwards" at the command prompt and hit 'Enter.' You will see the word "sdrawkcab" displayed on the screen.

The embedded example above is tagged using tags pairs from the tag set to delineate pertinent words and phrases, as follows:

<test-example> . . .
Example <test-name> 3.2.1.</test-name> Type "<test-step> reverse backwards </test-step>" at the command prompt and hit 'Enter.' You will see the word "sdrawkcab" displayed on the screen.
<test-golden-file
location='http://www.docs.com/examples/program.output'></test-golden-file>
. . . </test-example>

The <test-step> tag pair shown above delineates the pertinent phrase "reverse backwards," which represents a command given by the user to the command line tool. After tagging, example 3.2.1 above is an extractable embedded example. The <test-golden-file> tag pair above gives a location for a correct result of the test, i.e., what the user expects to see when executing the instruction (Alternately, instead of using the <test-golden-file> tag pair, "sdrawkcab" could be tagged a using a <test-output> tag pair). Additional tags may be used as needed. For example, <test-source> and </test-source> tags may be used to locate additional files, as needed.

Once embedded examples in the command line tool documentation are tagged, and extractable embedded examples are created, as described above, the extractable embedded examples are extracted from the command line tool documentation (Step 52). A test suite is created using extracted examples (Step 54). The test suite includes a number of inputs that test functionality of the command line tool. For example, referring to the previous example, an input to the command line tool, and thus a part of the test suite, is a string "reverse backwards," extracted as an extractable embedded example from the command line tool documentation, where the command line tool is expecting a command ("reverse") and an argument ("backwards"). With the test suite created, a command line tool is selected against which to execute the test suite (Step 56). The test suite is executed against the command line tool (Step 58). For example, operating system calls may be used (along with other mechanisms/techniques) to execute the test suite.

A result of executing the test suite against the command line tool is compared to a stored result in a golden file (Step 60). For example, a correct command line tool output in response to the test from the previous example is "sdrawkcab." The result of the test is output to, for example, a computer file for storage (Step 62). If output resulting from the test does not match the golden file, a determination is made as to whether a correction to the command line tool documentation is necessary and/or appropriate (Step 64). For example, a specifications guide, which includes criteria for proper operation and expected performance of the command line tool, and is linked to the command line tool documentation, may be used in Step 64. If a correction to the command line tool documentation is necessary and/or appropriate, then extractable embedded examples within the command line tool documentation are corrected (Step 66). For example, a test harness, using the specifications guide, may use text substitution to correct extractable embedded examples in the command line tool documentation. Otherwise, if corrections to the command line tool documentation are not determined to be appropriate, corrections are not made programmatically, but are made by a documentation writer, a test engineer, etc.

SUMMARY OF INVENTION

In general, in one aspect, the invention relates to a method of testing an embedded example in a graphical user interface documentation. The method comprises creating an extractable embedded example by tagging the embedded example, extracting the extractable embedded example from the graphical user interface documentation to generate an extracted example, selecting a tagged entity from the extracted example, interpreting the tagged entity to generate an interpreted tagged entity, creating a test suite using the interpreted tagged entity, selecting a graphical tool against which to execute the test suite, executing the test suite against the graphical tool to generate an output response, and verifying the output response.

In general, in one aspect, the invention relates to a method of testing an embedded example in a graphical user interface documentation. The method comprises creating an extractable embedded example by tagging the embedded example, extracting the extractable embedded example from the graphical user interface documentation to generate an extracted example, selecting a tagged entity from the extracted example, interpreting the tagged entity to generate an interpreted tagged entity, creating a test suite using the interpreted tagged entity, selecting a graphical tool against which to execute the test suite, executing the test suite against the graphical tool to generate an output response, creating a golden file using at least one tag from a tag set, comparing the output response to the golden file, creating the tagged entity using at least one tag chosen from the tag set, locating a source of error if the output response varies from the golden file, correcting the extractable embedded example if the output response varies from the golden file, and generating a comparison result after comparing the output response to the golden file.

In general, in one aspect, the invention relates to a computer system for testing an embedded example in a graphical user interface documentation. The computer system comprises a processor, a memory, a storage device, a computer display, and software instructions stored in the memory for enabling the computer system under control of the processor, to perform creating an extractable embedded example by tagging the embedded example, extracting the extractable embedded example from the graphical user interface documentation to generate an extracted example, selecting a tagged entity from the extracted example, interpreting the tagged entity to generate an interpreted tagged entity, creating a test suite using the interpreted tagged entity, selecting a graphical tool against which to execute the test suite, executing the test suite against the graphical tool to generate an output response, and verifying the output response.

In general, in one aspect, the invention relates to an apparatus for testing an embedded example in a graphical user interface documentation. The apparatus comprises means for creating an extractable embedded example by tagging the embedded example, means for extracting the extractable embedded example from the graphical user interface documentation to generate an extracted example, means for selecting a tagged entity from the extracted example, means for interpreting the tagged entity to generate an interpreted tagged entity, means for creating a test suite using the interpreted tagged entity, means for selecting a graphical tool against which to execute the test suite, means for executing the test suite against the graphical tool to generate an output response, and means for verifying the output response.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 3:
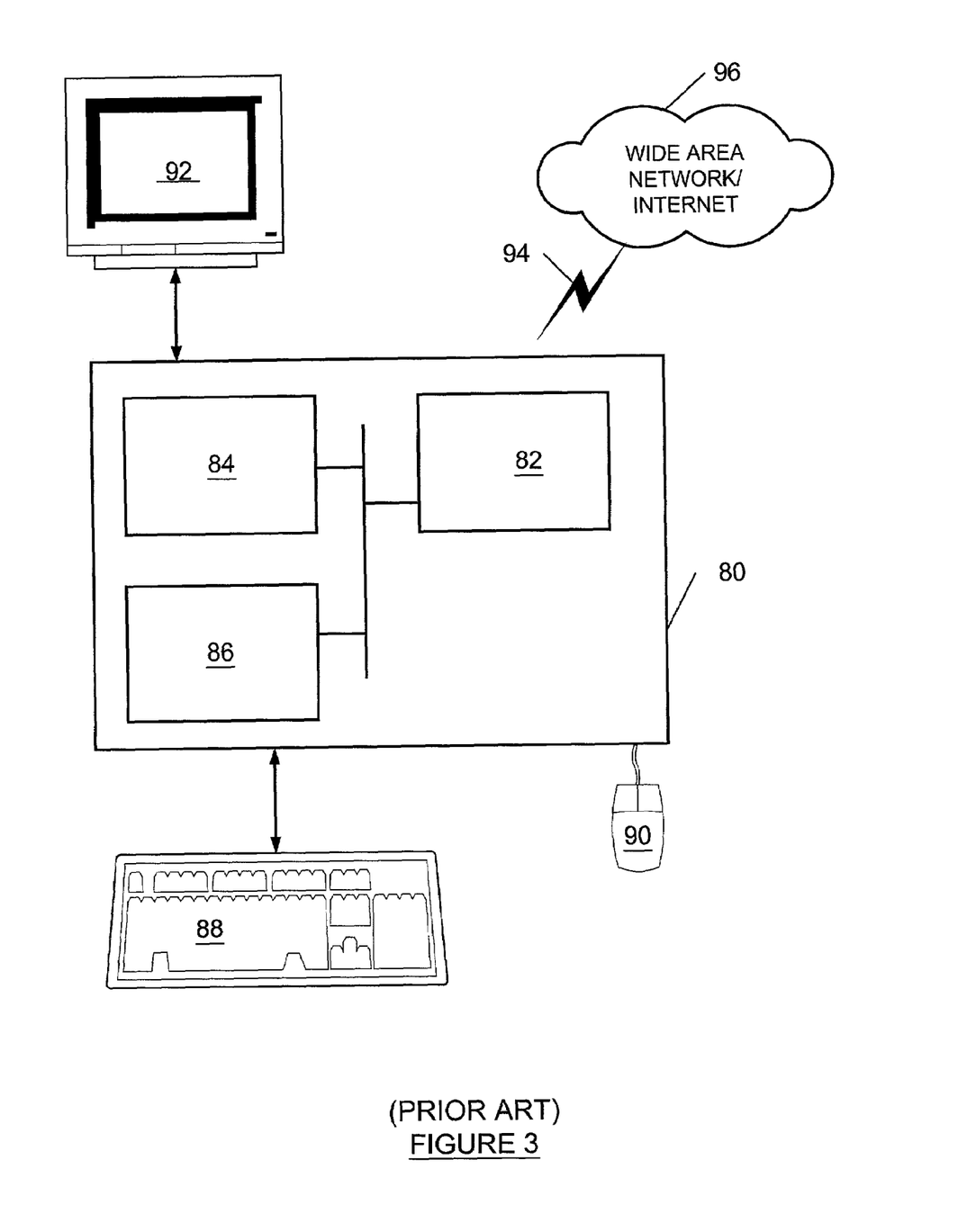
FIG. 3 shows an embodiment of a networked computer system.

The invention may be implemented on virtually any type computer regardless of the platform being used. For example, as shown in FIG. 3, a typical computer (80) includes a processor (82), associated memory (84), a storage device (86), and numerous other elements and functionalities typical of today's computers (not shown). The computer (80) may also include input means, such as a keyboard (88) and a mouse (90), and an output device, such as a monitor (92). Those skilled in the art will appreciate that these input and output means may take other forms in an accessible environment. The computer (80) may be connected via a network connection (94) to a Wide Area Network (WAN) (96), such as the Internet.

Figure 4:
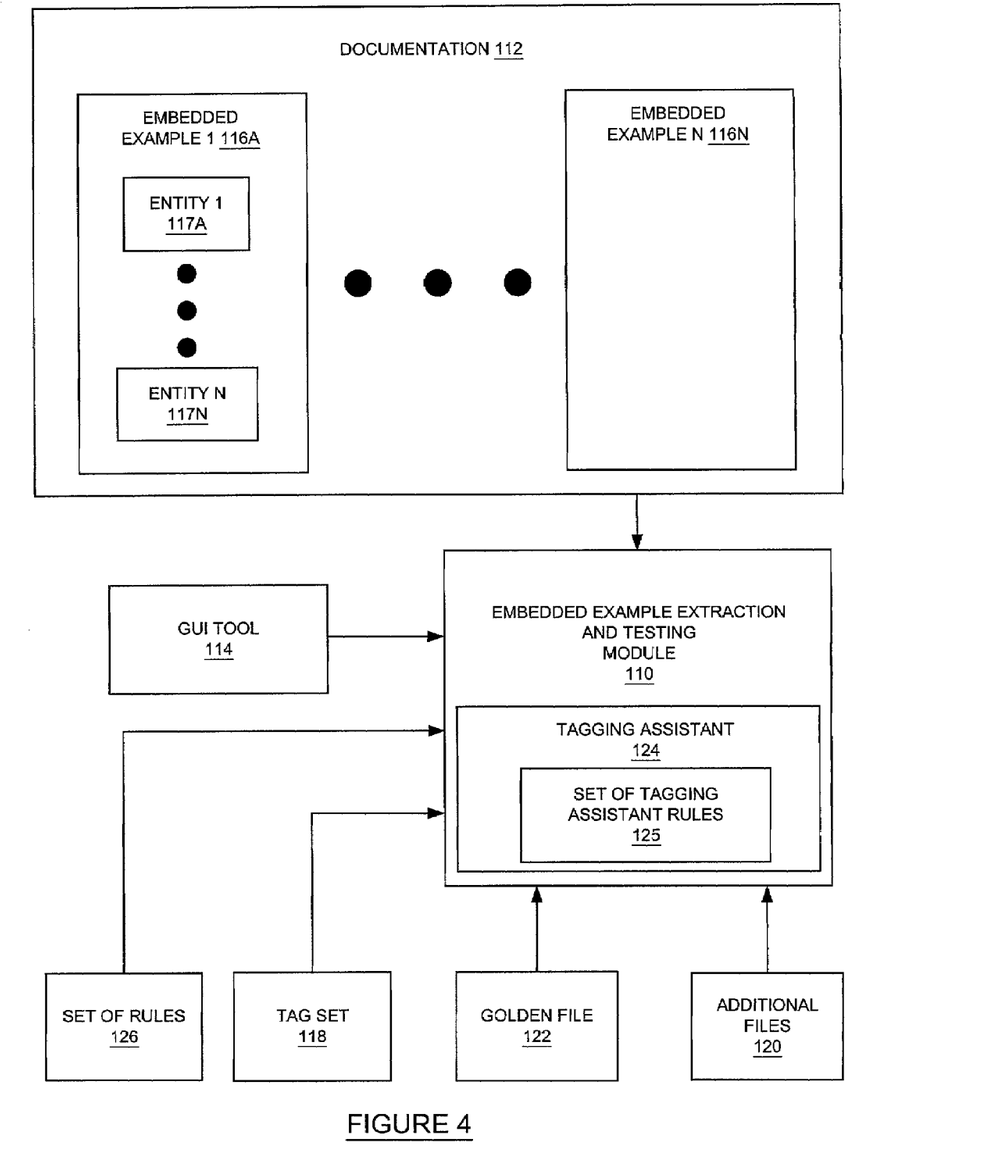
FIG. 4 shows an Embedded Example Extraction and Testing Module (EEETM) and associated testing components, in accordance with one or more embodiments of the invention.

In accordance with one or more embodiments, a collection of testing components as shown in FIG. 4 are used to test embedded examples in GUI tool documentation. An Embedded Example Extraction and Testing Module (EEETM) (110) accesses documentation (112) that provides an explanation about the operation of a GUI tool (114) for a user. Embedded example 1 (116A) through embedded example N (116N) within the documentation (112) use images and text to explain how the GUI tool (114) operates.

Included within embedded example 1 (116A) through embedded example N (116N) are one or more entities. Although only embedded example 1 (116A) shows entities, each embedded example may have one or more entities. An entity is a pertinent word or words, a pertinent phrase, or a pertinent section of text or image included in the documentation (112), which is pertinent to testing the embedded examples. An embedded example may have one or more test steps, where a test step is one of a series of related user actions. For example, an embedded example (e.g., embedded example 1 (116A)) may include a test step that shows a user how to copy text from a first textbox, and paste the text into a second textbox. The test step, and each test step within embedded example 1 (116A), is an entity.

Each of entity 1 (117A) through entity N (117N) may have one more nested entities. For example, for the test step that shows a user how to copy text from a first textbox, and paste the text into a second textbox, "copy," "first textbox," "paste," and "second textbox" are each an entity. Furthermore, a result of a user action may be shown as part of the embedded example, e.g., the example may show an image of the appearance of the GUI tool (114) after the user action. In one or more embodiments of the invention, the EEETM (110) may work in conjunction with an external GUI testing tool, such as a commercial GUI testing tool.

A tag set (118) includes pairs of start and closing tags (tag pairs) used to tag embedded example 1 (116A) through embedded example N (116N) and entities within each embedded example (e.g., entity 1 (117A) through entity N (117N)). Tagging an embedded example and entities within the embedded example (e.g., example 1 (116A) and entity 1 (117A) through entity N (117N)) involves delineating embedded example 1 (116A) and entity 1 (117A) through entity N (117N) with appropriate tag pairs. The tag set (118) includes a tag pair sufficient to delineate (and thus define) each of embedded example 1 (116A) through embedded example N (116N) (e.g., a test example tag pair, <test-example> and </test-example>). The tag set (118) includes tag pairs sufficient to delineate (and thus define) each entity (e.g., entity 1 (117A) through entity N (117N)) in embedded example 1 (116A) through embedded example N (116N). For example, a test step tag pair (<test-step> and </test-step>) is used to tag a test step that occurs within an embedded example, where a test step is a series of related user actions. An entity that has been delineated with a tag pair is a tagged entity. The tag set (118) is described in more detail later.

Still referring to FIG. 4, additional files (120) include files needed to conduct a test of embedded example 1 (116A) through embedded example N (116N) by the EEETM (110) executed against the GUI tool (114). For example, the additional files (120) may include function or method prototypes for sending messages to the GUI tool (114). A golden file (122) may include, for example, a text representation of a widget hierarchy of the GUI tool (114) to represent a status of the GUI tool (114) after a user action, such as clicking on a button.

A Tagging Assistant (124) is a software component that provides functionality for automated initial tagging of embedded example 1 (116A) through embedded example N (116N). With respect to tagging embedded examples, the Tagging Assistant (124) is guided by a Set of Tagging Assistant Rules (125). The Set of Tagging Assistant Rules (125) is based on conventions of the documentation (112) being parsed (man pages, online help, etc.). For example, indentation, fonts, or how an embedded example begins or ends may differ for different documentation (112).

A Set of Rules (126) may, in accordance with one or more embodiments of the invention, establish expectations for what tagged entities are required and/or expected as part of an extractable embedded example. The Set of Rules is used by the EEETM (11) to determine what tagged entities (e.g., entity 1 (117A) through entity N (117N)) are required or expected in an extractable embedded example.

As a first example, if an extractable embedded example includes an instruction to the user to click a mouse, then, by necessity, the extractable embedded example includes a tagged entity representing where the user clicks the mouse (e.g., the user clicks the mouse on an "Enter" button). Therefore, for the first example, a rule of the Set of Rules (126) indicates that if a first tagged entity in the extractable embedded example (or in a test step) represents a mouse click, then a second, related, tagged entity in the embedded example (or in the test step) is expected, and, therefore, is delineated to represent the location that the mouse is clicked. Those skilled in the art will appreciate that the use of "first" and "second" above to describe related entities does not necessarily imply a particular order with respect to the related entities, but may instead be used to differentiate between distinct entities.

As a second example, a rule of the Set of Rules may stipulate that if a test action is an instruction for the user to "copy," then of necessity there exists test data (which is copied by the user), and a test operand (a source of the data, e.g., a first textbox) and a test target (a destination of data that is copied, e.g., a second textbox). Each of "copy," the test data, the test operand, and the test target is represented in a particular embedded example by a tagged entity.

The Set of Rules (126) may be constructed, in accordance with one or more embodiments of the invention, using a form of a context-free grammar. Use of context-free grammars in the invention is in the same manner as is well known in the art. In the Set of Rules (126) using a form of context-free grammar, a left-hand side of a rule represents a non-terminal tagged entity, and a right-hand side of the rule represents a regular expression including one or more non-terminal and/or terminal tagged entities. In one or more embodiments of the invention, a first rule of the Set of Rules (126), however, has a left-hand side that represents an embedded example (which is not defined as a tagged entity). For example, the Set of Rules (126) may be similar to that which is shown in part below (where "+" represents logical AND, and "‖" represents logical OR, and "*" represents one or more occurrences):

test-example→test-step*
    test-step→(test-action)*+(test-operand)*‖ test-step ‖ null
    test-action→click ‖ copy ‖ drag ‖ drop ‖ paste ‖ test-action ‖ null Application of the Set of Rules (126) is dependent upon recognition of tagged entities parsed from documentation (112). Thus, sufficient tag pairs are needed in order to define each entity by tagging (delineation with a tag pair). In order to define by delineation a user action, the tag set (118) includes a test action tag pair (<test-action> and </test-action>) to delineate an entity (e.g., entity 1 (117A) through entity N (117N)) that is a test action, such as would occur within a test step. For example, the documentation may instruct the user to click a mouse on a button of the GUI tool (114). Clicking the mouse is an example of a test action. The text in the documentation (112) that instructs the user to click the mouse is an entity (e.g., entity 1 (117A) through entity N (117N)) to be delineated with a test action tag pair.

Other tag pairs may be used to tag entities (e.g., entity 1 (117A) through entity N (117N)) within a particular test step, such as data (e.g., a section of text), operands, and targets (e.g., a second textbox). Using the example, a data tag pair (<test-data> and </test-data>) is used to delineate the section of text; an operand tag pair (<test-operand> and </test-operand>) is used to delineate the first textbox; a target tag pair (<test-target> and </test-target>) is used to delineate the second textbox.

The tag set (118) may include other tags, such as tags used to indicate a location of an image that is a proper result of a user action. For example, a test-result tag (<test-result> and </test-result>) may be combined with an attribute element to indicate a location of a file where the result (such as an image) may be located, such as:

"<test-result location='file:///filename.hierarchy'></test-result>."

In one or more embodiments of the invention, tags may be used with attributes, where an attribute is a value assigned to a variable and placed within a tag. For example, an attribute may be used to place the result of a user action in context with the user action that caused the result, as in the tagged documentation shown below:

. . .
    <test-step ID=5.2.1-1><test-action> Click</test-action> on the <test-operand> Open Button</test-operand> of the <test-window> File Dialog </test-window> to load the program into the debugger
    </test-step ID=5.2.1-1> . . . FIG. 5-3 shows the debugger with a loaded file.
    <test-results ID=5.2.1-1> location='file://filename.hierarchy'>
    . . .

The "ID=5.2.1-1" attribute shown in the tagged documentation above links the user action ("Click") of the test step with the location of a file that stores a result of the test step (e.g., an image of a debugger with a loaded file).

An attribute may also be used with a tag in order to disambiguate context with respect to which window of the GUI tool (114) a user action is directed. For example, as shown in the tagged documentation below, a "window" attribute has a value of "File Dialog," thus notifying the EEETM (110) that the "Open Button" is on the File Dialog window:

. . .
    <test-step><test-action> Click</test-action> on the <test-operand window="File Dialog"> Open Button</test-operand>
    . . .

An attribute may be used with a tag in order to include example context with respect to steps and/or user actions described in a prior embedded example that are used by a later embedded example. For example, a test-start tag with an exampleContext attribute may be used to notify the EEETM (110) that the later embedded example uses test steps described earlier in the prior embedded example, as shown below:

. . .
    <test-start exampleContext=3.1.2 steps="1-7,9"> . . . </test-start>
    . . .

The "exampleContext=3.1.2" attribute shown in the tagged documentation above notifies the EEETM (110) to include/regenerate steps 1–7 and 9 of example 3.1.2 when interpreting this particular tag shown in the example above.

A test check tag may be used with an attribute in order to facilitate testing of the GUI tool (114). For example, during a test of the GUI tool (114), inputs are sent to the GUI tool (114). However, the input sent to the GUI tool (114) requires that the GUI tool (114) be ready to accept the input, or else the test may fail. For example, an input sent to a debugger window may require that the debugger window has a "focus" (i.e., accepts keyboard and mouse input). In order to ensure that the debugger window has the "focus," a test check tag with an attribute of "window=Debugger" may be placed into the extractable example so that the EEETM (110) generates the input(s) to the GUI tool (114) to ensure that the debugger window has the "focus."

Figure 5:
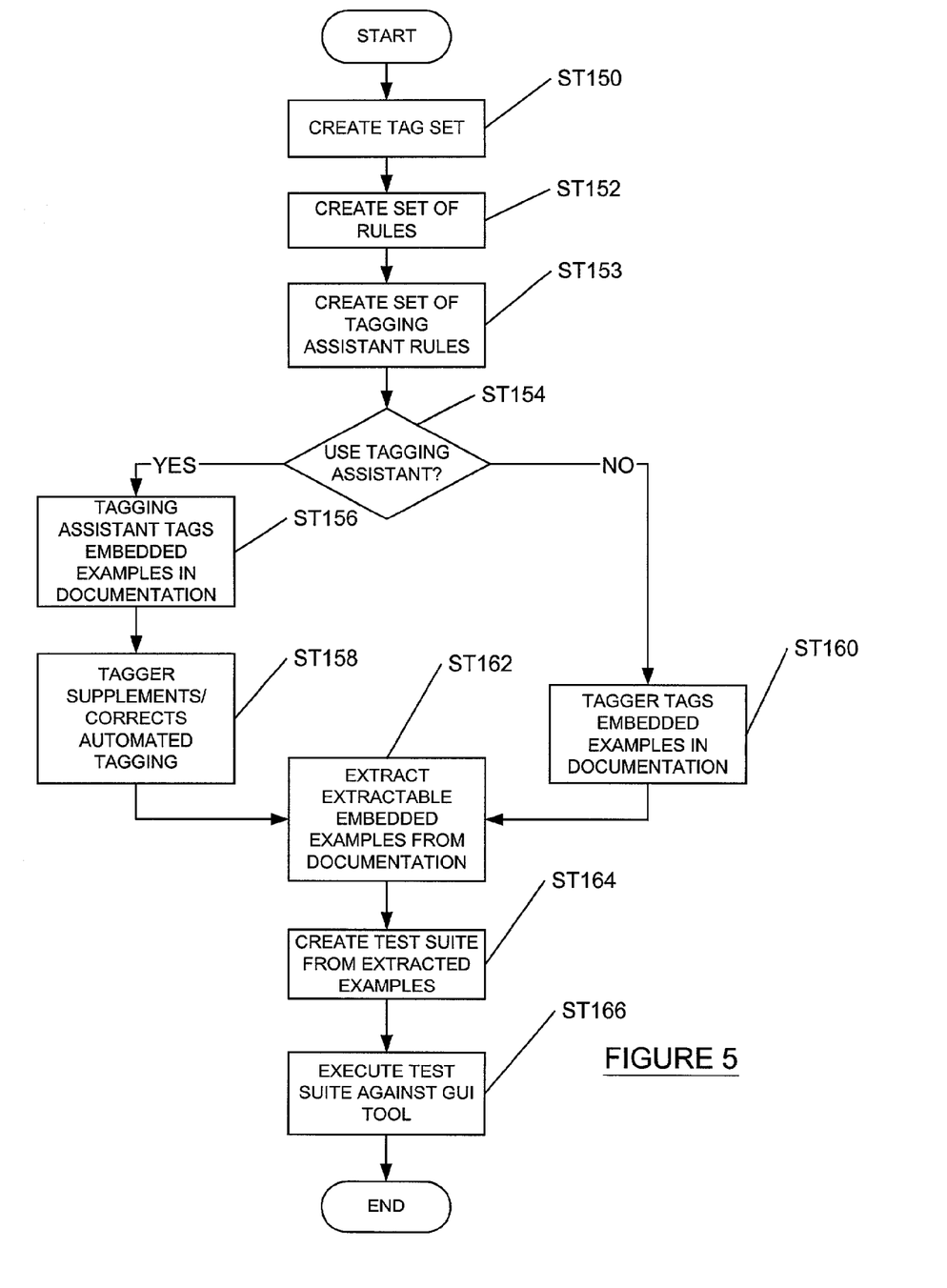
FIG. 5 shows a sequence of operations for testing embedded examples in Graphical User Interface (GUI) tool documentation, in accordance with one or more embodiments of the invention.

FIG. 5 illustrates a sequence of operations for a test of embedded examples in the documentation for the GUI tool, in accordance with one or more embodiments of the invention. The tag set is created (Step 150). The tag set may be created by a technical writer, a test engineer, etc. Contents of the tag set depend on the particular needs of the GUI tool being tested. Tags of the tag set are capable of assigning meaning to each entity in the embedded examples. When each entity in the embedded examples is delineated with the appropriate tags from the tag set, the tagged entities can be interpreted by the EEETM and assigned meaning for generating test steps for that particular example. Additionally, control tags are created sufficient to allow the EEETM to generate a test suite to test the GUI tool. Control tags are tags that perform functions such as locating files, giving context, etc.

The Set of Rules is created sufficient to describe patterns of entities in the embedded examples (Step 152). For example, a rule of the Set of Rules holds that for each embedded example, one or more test steps is possible; another rule holds that for each test step, one or more test-actions is possible within the test-step, etc. The Set of Rules, in accordance with one or more embodiments of the invention, is a context-free grammar that is input into the EEETM. The Set of Rules can be designed to be used independently of any particular GUI tool being tested. A Set of Tagging Assistant Rules is created (Step 153). The Set of Tagging Assistant Rules is specific to the particular type of documentation being parsed; several different Sets of Tagging Assistant Rules may be used to cover different types of documentation for a particular tool.

Once the tag set, the Set of Rules, and the Set of Tagging Assistant Rules exist, a determination is made as to whether the optional Tagging Assistant is advisable and/or is to be used to accomplish initial automated tagging of the embedded examples in the documentation (Step 154). The distinction of whether or not the Tagging Assistant is used depends, in accordance with one or more embodiments of the invention, on how consistent documentation is with the particular format of embedded examples in the documentation. If the Tagging Assistant is used, the Tagging Assistant uses the Set of Tagging Assistant Rules to tag the embedded examples by delineating entities of the embedded examples and embedding control tags where needed (Step 156).

The correctness and completeness of resulting initial automated tagging generated by the Tagging Assistant is dependent upon completeness and correctness of the Set of Tagging Assistant Rules. The purpose of the Tagging Assistant is to perform bulk tagging with minimal effort in order to free up personnel, such as technical writers and test engineers. The Tagging Assistant, in accordance with one or more embodiments of the invention, may make multiple passes over the documentation to generate a more correct and comprehensive initial automated tagging.

When the Tagging Assistant has completed initial automated tagging, a Tagger, such as a technical writer or a test engineer, corrects and/or supplements the initial automated tagging (Step 158). Upon examining the initial automated tagging, the Tagger may adjust the Set of Tagging Assistant Rules for accuracy. When the Tagger is satisfied that each embedded example, and each entity within each embedded example, has been properly and completely tagged (i.e., delineated with a tag pair), and control tags have been embedded into the documentation as needed, tagging is deemed complete by the Tagger.

If the Tagging Assistant is not used, the Tagger tags the embedded examples of the documentation manually (Step 160). Manual tagging may occur in multiple iterations, in accordance with one or more embodiments of the invention. In order to facilitate manual tagging, the Tagger may use a Translator to periodically check that results of tagging a portion of the documentation are as expected. The Translator, based on the Set of Rules, provides functionality for producing a check of one or more embedded examples or test steps that have been tagged from a portion of the documentation, without having to parse the entirety of the documentation. Thus, the Tagger may tag an embedded example, and use the Translator to determine whether the embedded example has been tagged properly, or which tag pairs are missing.

Once the documentation has been properly tagged, thus creating extractable embedded examples, the EEETM extracts the extractable embedded examples from the documentation (Step 162), creates a test suite from extracted extractable embedded examples (Step 164), and executes the test suite against the GUI tool (Step 166). Because of possible incorrect tagging, in one or more implementations of the invention, test failures produced during the initial execution of the test suite are debugged for incorrect or incomplete tagging. Steps 162, 164, and 166 are covered in detail later in this document.

Figure 6:
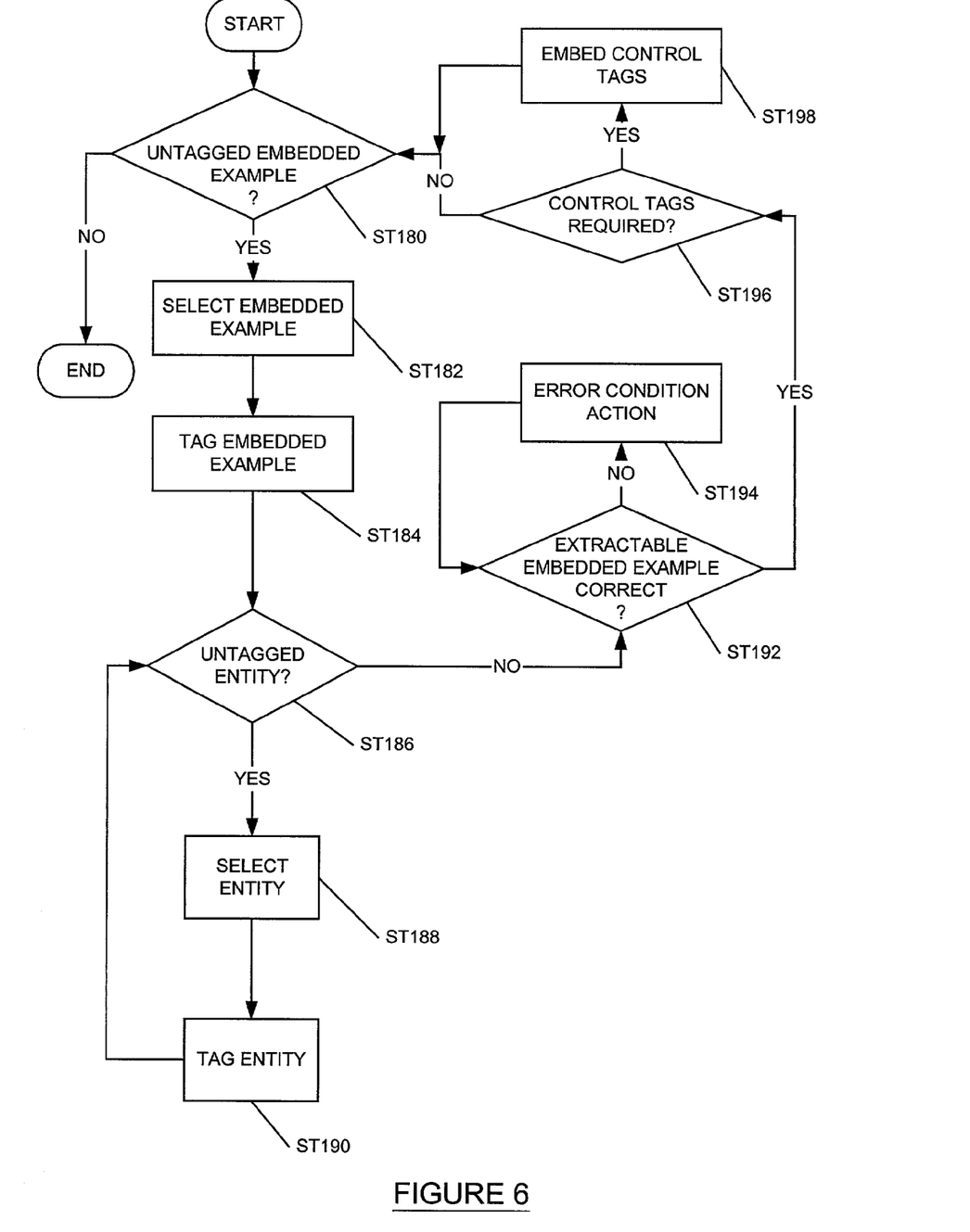
FIG. 6 shows a sequence of operations for tagging embedded examples in documentation for a GUI tool, in accordance with one or more embodiments of the invention.

FIG. 6 shows a sequence of operations for tagging the documentation containing images and text manually or automatically, in accordance with one or more embodiments of the invention. A determination is made as to whether an untagged embedded example exists in the documentation (Step 180). An embedded example is considered tagged when the embedded example and each entity within the embedded example has been tagged (i.e., delineated with a tag pair), and necessary control tags have been embedded to facilitate testing of the embedded example. If no untagged embedded examples exist in the documentation, tagging is complete. Otherwise, an embedded example is selected in the documentation (Step 182). The embedded example is selected using a header of the embedded example (e.g., "Example 3.2.1" signals a start of an embedded example, and "Example 3.2.2" signals an end of the embedded example) and/or a particular font associated with the header. The embedded example is tagged (i.e., delineated with a start tag and an ending tag), thereby generating an extractable embedded example (Step 184).

Once the embedded example has been delineated, a determination is made as to whether an untagged entity exists within the embedded example (Step 186). If an untagged entity exists, the entity is selected (Step 188), and the entity is tagged using a tag from the tag set (Step 190). After the entity is tagged, Step 186 is performed. Steps 186 through 190 are performed until each entity in the embedded example has been tagged. In accordance with one or more embodiments of the invention, the Set of Rules is used in tagging entities in the embedded example. For example, recursive parsing techniques and recognizing techniques commonly known in the art may be used in conjunction with the Set of Rules to tag each entity in the embedded example.

Once each entity in the embedded example has been tagged, and an extractable embedded example has thus been created, a determination is made as to whether the extractable embedded example is correct (Step 192). For example, a particular rule of the Set of Rules may require a particular entity be found in the extractable embedded example, and if the entity is not found in the extractable embedded example, the extractable embedded example is not correctly tagged. If the extractable embedded example is not correct, an error condition action is performed (Step 194). For manual tagging by the Tagger, performing an error condition action may involve correcting the tagging of the extractable embedded example. If the Tagging Assistant is tagging, an error message is displayed. Steps 192 and 194 are performed until the extractable embedded example is correct.

Once the extractable embedded example is correct, a determination is made as to whether control tags are required (Step 196). For example, a control tag may be needed to give a location of a needed file. If control tags are required, control tags are embedded appropriately (Step 198). Otherwise, if control tags are not required, Step 180 is performed, and Steps 180 through 198 are performed until each example in the documentation is complete.

Figure 8:
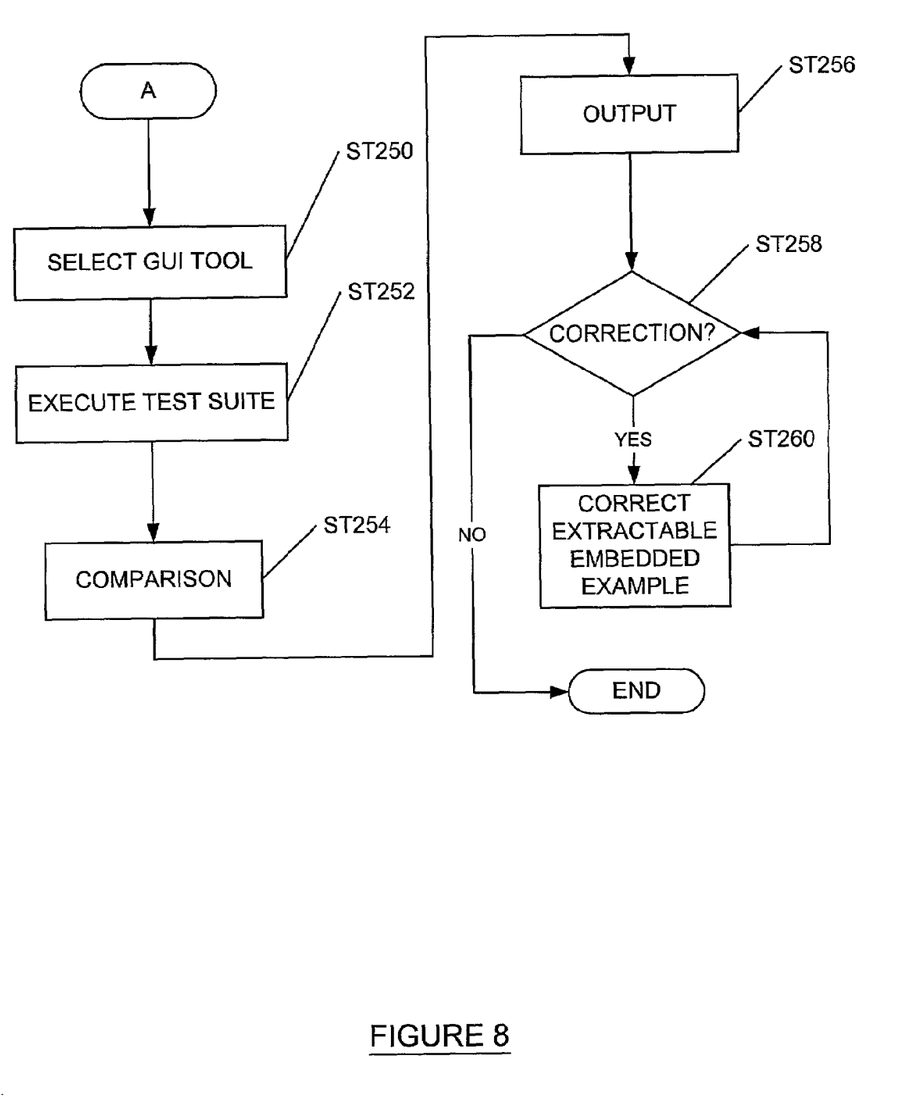
FIG. 8 shows a second part of a sequence of operations for a test of extractable embedded examples in documentation for a GUI tool, in accordance with one or more embodiments of the invention.
Figure 9:
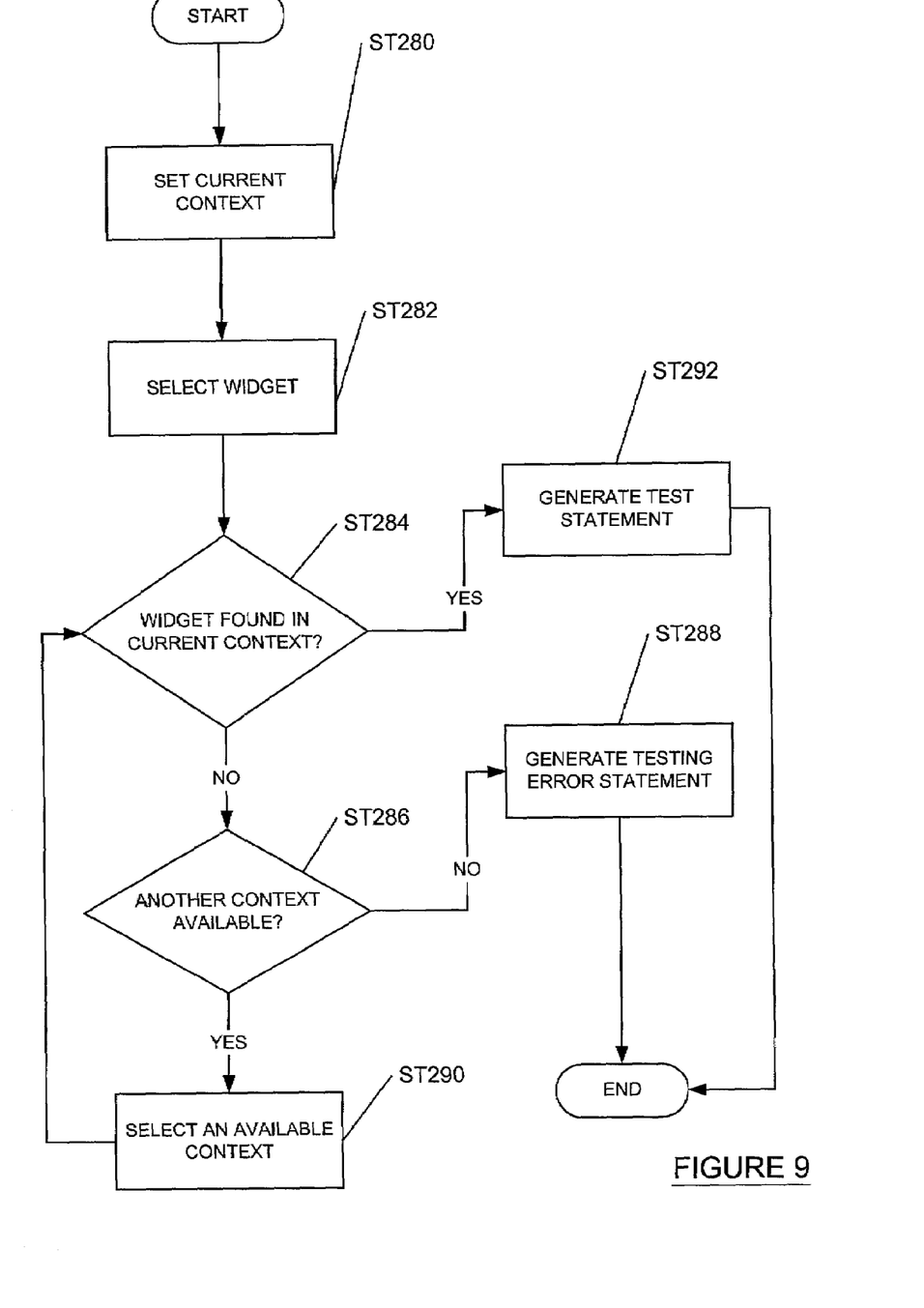
FIG. 9 shows a sequence of operations for executing a test suite against a GUI tool, in accordance with one or more embodiments of the invention.

Once the embedded examples in the documentation are tagged, a test suite may be created and executed against the GUI. A sequence of operations to parse and extract extractable embedded examples from the documentation, create a test suite, and execute the test suite against the GUI tool is shown in FIG. 7, FIG. 8, and FIG. 9.

Figure 7:
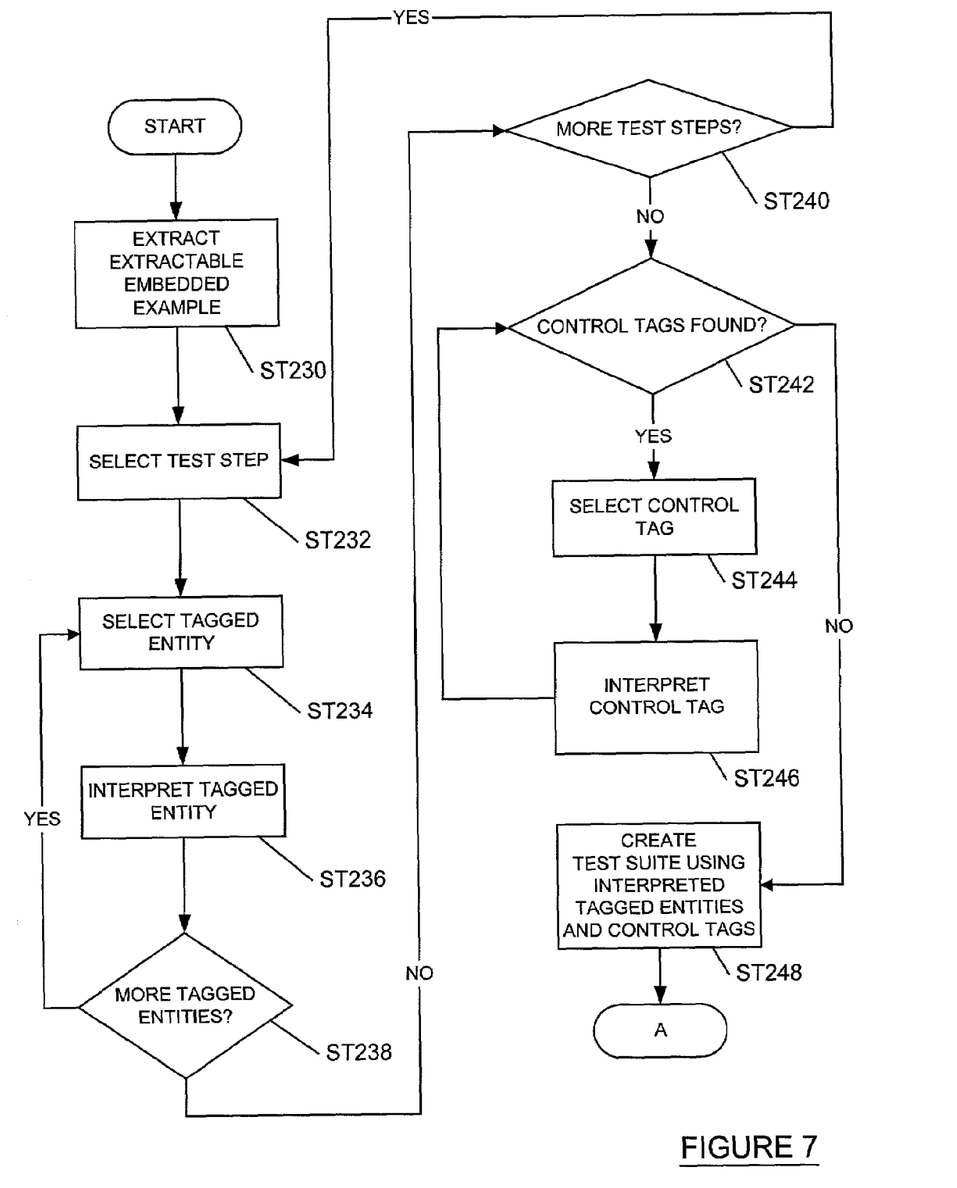
FIG. 7 shows a first part of a sequence of operations for a test of extractable embedded examples in documentation for a GUI tool, in accordance with one or more embodiments of the invention.

Referring to FIG. 7, an extractable embedded example is extracted from the documentation (Step 230). Because the extractable embedded example is delineated by a start tag and a closing tag, e.g., "<test-example>" and "</test-example>," a parsing tool, such as a recursive descent parser, can detect and extract the extractable embedded example. Within the extractable embedded example are one or more test steps. After the extractable embedded example is extracted, a test step is selected (Step 232). Within the test step are one or more tagged entities, one of which is selected (Step 234). A selected tagged entity is interpreted (Step 236). Interpreting the selected tagged entity involves determining a relationship of the selected tagged entity with respect to other tagged entities in the test step and with respect to the GUI tool.

In accordance with one or more embodiments of the invention, lookup tables from the additional files (120 in FIG. 4) are used to relate the selected tagged entity to other tagged entities in the test step and to the GUI tool. For example, tagged entities in the extractable embedded example may be mapped to arguments of a method using the lookup tables. The method is used to send input to the GUI.

A determination is made as to whether more tagged entities exist in the test step (Step 238). If another tagged entity exists in the test step, the sequence of operations continues to Step 234. Otherwise, a determination is made as to whether more test steps exist in the extractable embedded example (Step 240).

If another test step exists in the extractable embedded example, the sequence of operations continues to Step 232, and Steps 232 through 240 are performed until each entity in each test step of the extractable embedded example has been interpreted. Otherwise, if no more steps remain, a determination is made as to whether control tags exist in the extractable embedded example (Step 242). For example, control tags may exist in the extractable embedded example in order to set window or example context, or indicate a location of a needed file, etc. If a control tag exists, the control tag is selected (Step 244) and interpreted (Step 246). Steps 242, 244, and 246 are performed until no further control tags require interpretation. In accordance with one or more embodiments of the invention, controls tags are selected and interpreted before, or concurrent with, selection and interpretation of tagged entities.

Next, a test suite is created (Step 248). To create the test suite, interpreted tagged entities are examined and assembled into a form suitable for executing against the GUI tool. Rules included in the Set of Rules and/or additional files (120 in FIG. 4) are consulted in order to create the test suite. For example, a lookup table included as part of the additional files (120 in FIG. 4) may be consulted in order select an appropriate method and/or system call with which to send a message to the GUI, thus generating a test statement to test the GUI.

The sequence of operations is continued in FIG. 8. Once the test suite is created, a GUI tool is selected (Step 250). The GUI tool may be selected using a variety of different techniques. For example, the name and location of a GUI tool may be included in an embedded example with the documentation.

Next, the test suite is executed (Step 252). In accordance with one or more embodiments of the invention, the EEETM executes the test suite by sending inputs to the GUI tool via messages using methods, system calls, GUI test tools, and/or operating system Application Programming Interfaces (API's).

A particular sequence of operations for execution of a particular test suite may vary according to the needs of a particular test and/or a particular GUI tool. However, a possible sequence of operations for execution of a particular test suite is shown in FIG. 9. A current context of the GUI tool is set (Step 280). Depending upon how the test suite is constructed, the current context may be set by a window context tag. Alternatively, the current context may be set by selecting a current context from a data structure stored in memory and available for use in a test of the GUI tool. The data structure may be a list of contexts, or if a modal window (i.e., a window that has the "focus" as long as the window exists) is involved, a stack of lists of contexts. Creation of the data structure involves maintaining a set of available contexts used (i.e., windows that are currently open at that particular point in the test). The current context is used to focus the test upon a particular portion of the GUI tool under test, e.g., to test a particular widget (e.g., a button, a textbox, an icon, a window, or other feature of the GUI tool) on a particular window, when multiple windows are open.

Continuing the sequence of operations in FIG. 9, a single widget or multiple widgets are selected (Step 282). The widget is selected from the test. If a context has been set explicitly with a context tag or attribute, then the widget is found in the context or an error condition occurs. For example, if an editor window is the current context, and the widget is an "Open File Dialog" button, then the editor window should have an "Open File Dialog" button. Otherwise, if the editor window does not have an "Open File Dialog" button, an error may occur, or the test of the GUI tool may indicate that the GUI tool is not functioning properly.

However, if the context has not been set explicitly, the widget is assumed to occur in the current context. Next, a determination is made as to whether the widget is found in the current context (Step 284). If the widget is not found in the current context, a determination is made as to whether another context is available (Step 286). For example, a data structure, such as a list, may be accessed in order to determine if another context is available. If another context is not available, a testing error statement is generated (Step 288). Otherwise, if another context is available, then an available context is selected (Step 290), and the sequence continues to Step 284. If the widget is found in the current context in Step 284, a test statement is generated (Step 292). The test statement is an input to the GUI tool, and elicits a response from the GUI tool. For example, if the test statement represents a button click that creates a new window, the GUI tool, if working properly, responds by creating a new window. In accordance with one or more embodiments of the invention, test statements are input into a GUI test tool, which then acts upon the GUI tool to elicit a response.

Referring to FIG. 8, a response of the GUI tool to the test statement is compared to a proper response in a golden file (Step 254).). If the documentation includes an image of a window or a portion of a window (representing change(s) in response to a user action), an image file may also be stored as a golden file of the extractable embedded example. Alternately, the widget hierarchy (i.e., a text-based tree of the GUI tool's widgets and the widgets' state) may be stored in the golden file as the proper response, where relevant items may be tagged. For example, a test statement may cause a file named "main.c" to be selected in a file dialog. In order to indicate that selection of "main.c" is a proper response, the phrase "main.c" of the widget hierarchy may be delineated in the golden file with appropriate start and closing tags.

Output concerning a result of the test is generated (Step 256). Data is sent to an output and/or storage device, such as a monitor, a printer, a file, etc. A determination is made as to whether correction of the extractable embedded example is necessary and/or appropriate (Step 258). In limited circumstances, portions of the documentation may be corrected by the EEETM. For example, the EEETM may update images, widget hierarchies, and tagged (non-displaying) results in the documentation. In accordance with one or more implementations of the invention, results of a test may be tagged and embedded in the documentation, and not be seen by the user of the documentation because the tags that delineate such embedded results are detected by a documentation processor, and thus the embedded results are not displayed to the user.

Correction of extractable embedded examples may be facilitated by use of a reference document, such as a specifications guide, which is linked to the documentation. The specifications guide is one or more documents created during development of a tool, e.g., a GUI tool. The specifications guide is typically used by a team of software engineers to build the GUI tool. The specifications guide includes criteria for the proper operation of the GUI tool and contains information relating to what the GUI tool is expected to be able to do when development of the GUI tool is finished and ready to ship to the end user. If the specifications guide is prepared so that the EEETM can access and link to the specifications guide, then the specifications guide may be accessed and used to correct the extractable embedded example in some circumstances. Next, if appropriate, extractable embedded examples within the documentation and/or a defective GUI tool are corrected (Step 260). Steps 258 and 260 are performed until the extractable embedded example is correct.

Those skilled in the art will appreciate that the number of steps described in FIG. 5 through FIG. 9 discussed in this document may be greater or fewer in number, or the steps may occur in a different sequence than as discussed in this document. For example, the execution of the test suite may occur in a different time frame from the creation of the test suite. Often, a test suite is executed whenever a GUI tool or its operational environment changes. A new test suite is often created whenever the documentation is changed.

Advantages of the invention include one or more of the following. Automating testing of documentation examples enhances GUI tool quality, documentation quality, and software production efficiency. The construction of functionality is provided that detects differences between documented GUI tool behavior and actual GUI tool behavior, which leads to a reconciliation between documented GUI tool behavior and actual GUI tool behavior, thereby enhancing GUI tool and/or documentation quality. The construction of functionality is provided that may automatically correct errors in extractable embedded examples in documentation, thereby enhancing GUI tool quality and documentation quality. The construction of functionality is provided that may automatically detect and locate the source of some errors in a GUI tool associated with extractable embedded examples in documentation, thereby enhancing GUI tool quality.

A framework is provided for the coordination of groups working on quality control for documentation, thereby enhancing software quality and enhancing GUI tool production efficiency, customer satisfaction, and reducing error reports related to the potential mismatches between documentation and actual GUI tool behavior. A framework is provided for the automatic correction of errors in documentation and the embedding of tags in documentation, thereby improving documentation production efficiency.

Infrastructure used for the invention (e.g., the tag set) may be integrated into existing documentation that supports extensible markup language tagging, or the infrastructure may be used in any documentation that is parse-able, with the use of an additional documentation processor. The test suite used to test a GUI tool may be regenerated whenever embedded examples change, and executed whenever the GUI tool changes or is revised. Thus, the GUI tool and the documentation remain synchronized. Those skilled in the art will appreciate that the invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method of testing an embedded example in a graphical user interface documentation, comprising:
creating a golden file using at least one tag chosen from a tag set;
creating an extractable embedded example by tagging the embedded example; extracting the extractable embedded example from the graphical user interface documentation to generate an extracted example;
selecting a tagged entity from the extracted example;
interpreting the tagged entity to generate an interpreted tagged entity;
creating a test suite using the interpreted tagged entity;
selecting a graphical tool against which to execute the test suite;
executing the test suite against the graphical tool to generate an output response;
and verifying the output response,
wherein the verifying of the output response comprise comparing the output response to the golden file,
wherein the golden file comprises at least one predetermined response selected from a group consisting of an image and a widget hierarchy based on the graphical user interface documentation.

2. The method of claim 1, tagging the embedded example comprising delineating the embedded example using at least one tag chosen from a tag set.

3. The method of claim 1, further comprising:
creating the tagged entity using at least one tag chosen from a tag set.

4. The method of claim 1, wherein the golden file is created manually.

5. The method of claim 1, further comprising:
locating a source of error if the output response varies from the golden file.

6. The method of claim 1, further comprising:
correcting the extractable embedded example if the output response varies from the golden file.

7. The method of claim 1, further comprising:
generating a comparison result after comparing the output response to the golden file.

8. The method of claim 7, further comprising:
sending the comparison result to a display device.

9. The method of claim 7, further comprising:
storing the comparison result onto a storage device.

10. The method of claim 1, wherein the golden file is a proper output response of executing the test suite against the graphical tool.

11. The method of claim 1, interpreting the tagged entity comprising using a set of rules comprising a context-free grammar.

12. The method of claim 1, executing the test suite comprising:
setting a current context of the graphical tool;
selecting a widget from the test suite; and
generating a test statement directed to the widget if the widget is found in the current context.

13. The method of claim 12, further comprising:
selecting an available context to become the current context; and generating a testing error statement if the widget is not found.

14. The method of claim 13, wherein the available context is selected from a set of available contexts.

15. The method of claim 14, further comprising:
creating a data structure for storing the set of available contexts.

16. A computer implemented method of testing an embedded example in a graphical user interface documentation, comprising:
creating an extractable embedded example by tagging the embedded example;
extracting the extractable embedded example from the graphical user interface documentation to generate an extracted example;
selecting a tagged entity from the extracted example;
interpreting the tagged entity to generate an interpreted tagged entity;
creating a test suite using the interpreted tagged entity;
selecting a graphical tool against which to execute the test suite;
executing the test suite against the graphical tool to generate an output response;
creating a golden file using at least one tag chosen from a tag set, wherein the golden file comprises at least one predetermined response selected from a group consisting of an image and a widget hierarchy based on the graphical user interlace documentation;
comparing the output response to the golden file;
creating the tagged entity using at least one tag chosen from the tag set;
locating a source of error if the output response varies from the golden file;
correcting the extractable embedded example if the output response varies from the golden file;
and generating a comparison result after comparing the output response to the golden file.

17. A computer system for testing an embedded example in a graphical user interface documentation, comprising:
a processor;
a memory;
a storage device;
a computer display; and
software instructions stored in the memory for enabling the computer system under control of the processor, to perform:
creating a golden file using at least one tag chosen from a tag set;
creating an extractable embedded example by tagging the embedded example; extracting the extractable embedded example from the graphical user interface documentation to generate an extracted example;
selecting a tagged entity from the extracted example;
interpreting the tagged entity to generate an interpreted tagged entity; creating a test suite using the interpreted tagged entity;
selecting a graphical tool against which to execute the test suite;
executing the test suite against the graphical tool to generate an output response; and
verifying the output response,
wherein the verifying of the output response comprise comparing the output response to the golden file,
wherein the golden file comprises at least one predetermined response selected from a group consisting of an image and a widget hierarchy based on the graphical user interface documentation.

18. The computer system of claim 17, tagging the embedded example comprising delineating the embedded example using at least one tag chosen from a tag set.

19. The computer system of claim 17, interpreting the tagged entity comprising using a set of rules comprising a context-free grammar.

20. The computer system of claim 17, executing the test suite comprising:
setting a current context of the graphical tool;
selecting a widget from the test suite; and
generating a test statement directed to the widget if the widget is found in the current context.

21. An apparatus for testing an embedded example in graphical user interface documentation, comprising:
means for creating a golden file using at least one tag chosen from a tag set;
means for creating an extractable embedded example by tagging the embedded example;
means for extracting the extractable embedded example from the graphical user interface documentation to generate an extracted example;
means for selecting a tagged entity from the extracted example;
means for interpreting the tagged entity to generate an interpreted tagged entity;
means for creating a test suite using the interpreted tagged entity;
means for selecting a graphical tool against which to execute the test suite;
means for executing the test suite against the graphical tool to generate an output response; and
means for verifying the output response,
wherein the verifying of the output response comprise comparing the output response to the golden file,
wherein the golden file comprises at least one predetermined response selected from a group consisting of an image and a widget hierarchy based on the graphical user interface documentation.

* * * * *